Patented Oct. 30, 1945

2,387,934

UNITED STATES PATENT OFFICE 2,387,934

COMPOSITION OF MATTER AND POLYMERIZATION PRODUCTS THEREOF

Irving E. Muskat, Akron, and Franklin Strain, Norton Center, Ohio, assignors to Pittsburgh Plate Glass Company, Pittsburgh, Pa., a corporation of Pennsylvania No Drawing. Application June 8, 1942, Serial No. 446,286

8 Claims. (Cl. 260—80)

This invention relates to a new class of esters which are unsaturated carbonates having three carbonate radicals and two unsaturated groups. These compounds have the structure:

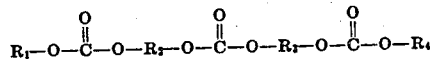

in which $R_1$ and $R_4$ are the radicals derived from unsaturated alcohols, preferably those containing three to five carbon atoms and an unsaturated linkage in an aliphatic chain such as allyl, chlorallyl, crotyl, methallyl, tiglyl, angelyl, chlorocrotyl α and β-ethylallyl and propargyl alcohols, methyl vinyl carbinol, ethyl vinyl carbinol, and $R_1$ and $R_4$ may, however, be the radicals derived from the alcohols containing six to ten carbon atoms such as cinnamyl, geranyl, linallyl, hexenyl, isopropylpropargyl and phenylpropargyl alcohols.

$R_2$ and $R_3$ in the above formula are organic radicals derived from polyhydroxy compounds such as glycol, trimethylene glycol, propylene glycol, tetramethylene glycol, di-, tri-, and tetraethylene glycols, di-, tri-, and tetrapropylene glycol, glycerine, the poly glycerols, erythritol, pentaerythritol, dextrose, cellulose, sucrose, etc., resorcinol, phthalyl alcohol, pyrogallol, catechol, etc.

The symmetrical type esters in which $R_1$ is identical to $R_4$ and in which $R_2$ is identical to $R_3$, are of greater importance, being of less complex synthesis. Intermediate compounds are first made by reacting sufficient quantities of unsaturated alcohol chloroformate with polyhydroxy compound to react with all except one of the hydroxy groups. The hydroxy groups have been found to be esterified substantially successively. For example, if glycol is treated with an equimolar quantity of allyl chloroformate the principal product will be allyl hydroxyethyl carbonate and only a small amount of glycol bis (allyl carbonate) will be present. When glycerol is similarly esterified it was found that the primary alcohol groups esterify quite readily while the secondary reacts less readily. Unsaturated partial esters of the hydroxy compounds which have more than three hydroxy groups may also be prepared.

The reaction is conducted by adding the unsaturated chloroformate in proper proportion to the polyhydroxy compound in the presence of an alkaline agent such as pyridine or other cyclic tertiary amine or the oxide, carbonate, or hydroxide of an alkali metal or alkaline earth metal. The reaction may be conducted in the presence of a suitable solvent, such as benzene, carbon tetrachloride, petroleum ether, toluene, etc. Ordinarily the reaction is initiated at temperatures between 0° C. and 20° C. but as the reaction approaches completion temperatures of 80° C. to 100° C. may be advantageous and are usually effected by heating on a water bath.

Although frequently the reaction may be controlled to produce the desired intermediate compounds in high yields, yet usually some of the completely esterified hydroxy compound is present. This may be separated by washing out the soluble hydroxy compound with water or similar solvent or by distillation in a vacuum. Generally, however, a small proportion of the completely esterified polyhydroxy compound is not objectionable since it has chemical and physical properties very similar to the new esters. Accordingly, separation is not always necessary.

The intermediate compounds are then reacted with phosgene which couples two molecules of the intermediate hydroxy compound with a carbonate linkage. The phosgene is introduced in gaseous or liquid form to the liquid intermediate which may contain a suitable solvent or diluent such as benzene, ether, toluene, etc., in the presence of an alkaline agent such as pyridine, NaOH, $CaCO_3$, etc. The resulting ester may be washed with dilute hydrochloric acid and/or water and freed of the more volatile impurities, by heating at reduced pressures.

Unsymmetrical variations of the new type esters may be prepared by first synthesizing the intermediate hydroxy esters such as allyl 2-hydroxyethyl carbonate, methallyl 3-hydroxy propyl carbonate, etc. and then converting the hydroxy ester into the corresponding chloroformate by reaction with phosgene in a neutral solution and preferably at temperatures below +20° C. The chloroformate may then be mixed with an equimolal quantity of a different monohydroxy ester of an unsaturated alcohol and a polyhydroxy compound, in the presence of an alkaline reactant. The unsymmetrical carbonates are thus produced.

The new carbonates are generally colorless liquids having relatively low viscosity. They are quite stable over wide ranges of temperatures. Accordingly, they are useful as plasticizers, solvents, etc. The new compounds polymerize readily in the presence of oxygen, hydrogen peroxide, organic peroxides, etc., especially when subjected to heat, or ultra violet light.

Many new and valuable resin compositions may be prepared by polymerizing the new chemical compounds. The monomeric or partially polymerized esters may be used as coating or impregnating compositions with or without added solvent. Suitable thickening agents, plasticizers, pigments, dyes, etc. may be incorporated. Such materials may be useful in the preparation of water-proofed fabrics or laminated sheets useful as a construction material. The new compounds may also be cast polymerized to transparent sheets suitable for use as glass substitutes. Similarly, irregular shapes may be prepared. Colored and other decorative objects may be prepared by incorporating fillers, pigments etc., and by using fibrous fillers, compositions with high impact strength may be secured. Molding powders containing monomer, partial polymer, or mixtures thereof with pigments, fillers, etc., may be used in direct pressure molding or injection molding processes.

The preparation and polymerization of the new materials will be more specifically demonstrated by the following examples:

*Example I*

A mixture of 620 grams of ethylene glycol and 435 grams of pyridine was prepared and cooled to 0° C. With vigorous stirring 603 grams of allyl chloroformate were added slowly while maintaining the temperature between 0 and 5° C. by means of an ice bath. The addition required 48 minutes. The mixture was washed with three volumes of water and separated into two liquid phases. By saturating the aqueous layer with anhydrous sodium sulfate, a second liquid phase was precipitated. The water solution was then extracted three times with one-half volume of ether. The ether was evaporated and the residue combined with the fraction salted out. This material was proven to be allyl 2-hydroxyethyl carbonate. One hundred grams of this water soluble hydroxy ester was suspended in 500 cc. of benzene and 60 grams pyridine. The mixture was cooled to 0° C. and saturated with phosgene by bubbling the gas through the solution at the rate of 15 millimoles per minute. The temperature remained below 18° C. throughout the reaction. After the reactants were combined, the benzene solution was washed with dilute hydrochloric acid and water and then dried over anhydrous $Na_2SO_4$. The benzene solution was heated to evaporate the benzene. A colorless liquid was found which had an index of refraction of 1.4539 and the formula:

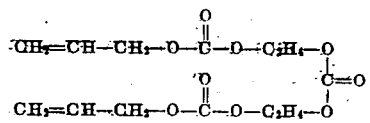

Three grams of the ester was mixed with 0.15 grams of benzoyl peroxide and heated at 75° C. for one hour. A hard polymer was formed.

*Example II*

A mixture of 175 grams of pyridine, 1000 cc. benzene, and 210 grams of diethylene glycol were cooled and while maintaining the reaction temperature between 0° C. and 8° C., 300 grams of methallyl chloroformate were added at the rate of 5 grams per minute. The benzene solution which contained principally methallylhydroxyethyl carbonate and smaller quantities of dimethallyl carbonate and diethylene glycol bis methallyl carbonate was treated with phosgene at temperatures maintained between +2° C. and +14° C. The phosgene was bubbled through the solution at the rate of 15 to 20 millimoles per minute. The reaction mass was washed with diluted hydrochloric acid and with water until neutral to litmus and then dried over anhydrous $Na_2SO_4$. The dried solution was heated with 2 grams of activated charcoal at 3 to 4 mm. until the benzene, the dimethallyl carbonate and other volatile impurities were evaporated. A colorless liquid was obtained having the structure:

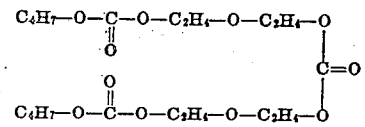

Five grams of the ester and 0.4 gram of acetone peroxide were thoroughly mixed and heated at 135° C. for one and one-half hours. A transparent solid having a very slight yellow color was formed.

*Example III*

Two moles of glycol (125 grams) and 180 cc. of pyridine were reacted with slightly less than an equivalent quantity of chlorallyl chloroformate (300 grams). The chloroformate was added dropwise with vigorous agitation while maintaining the reaction flask submerged in a mixture of salt and ice. During the reaction the temperature was held below +5° C. After standing overnight the mixture was again cooled to 0° C. and a stream of phosgene was passed into the reaction vessel at the rate of 20 millemoles per minute. After stirring for one hour the mixture was heated for two hours on a water bath and poured into an equal volume of ice water. Two hundred cc. of diethyl ether was added and the two liquid phases were separated. The ether solution was washed with hydrochloric acid and with water until neutral. The ether and other volatile impurities were removed by heating to 155° C. at a pressure of 3 mm. A light yellow liquid was thereby produced which was believed to consist essentially of the following ester.

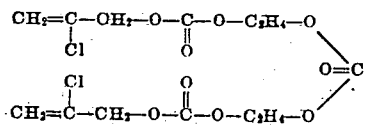

The ester polymerized readily when heated with 3% acetyl peroxide, for one hour at 75° C.

This application is a continuation-in-part of Serial No. 403,703, filed July 23, 1941, by Irving E. Muskat and Franklin Strain.

Although the invention has been described with respect to certain specific samples, it is not intended that the details of the same shall be construed as limitations upon the scope of the invention, except to the extent incorporated in the appended claims.

We claim:

1. A new polymerizable compound having the following molecular structure:

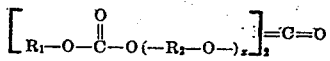

wherein $R_1$ is a radical corresponding to the radical $R_1$ in the alcohol $R_1OH$, said alcohol being an unsaturated monohydric alcohol having from three to ten carbon atoms and having an unsaturated carbon-to-carbon linkage adjacent the beta carbon atom therein, $R_2$ is a hydrocarbon radical selected from the class consisting of divalent saturated aliphatic hydrocarbon radicals and divalent aromatic hydrocarbon radicals and $x$ is a small whole number from 1 to 4.

2. A new polymerizable compound having the following molecular structure:

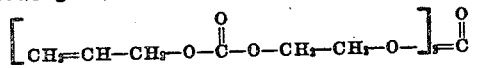

3. A new polymerizable compound having the following molecular structure:

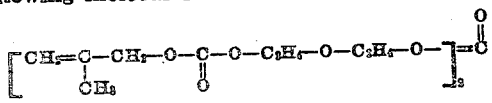

4. A new polymerizable compound having the following molecular structure:

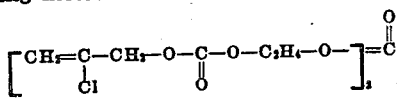

5. A polymer of the compound defined by claim 1.

6. A polymer of the compound defined by claim 2.

7. A polymer of the compound defined by claim 3.

8. A polymer of the compound defined by claim 4.

IRVING E. MUSKAT.
FRANKLIN STRAIN.